Figure 9:
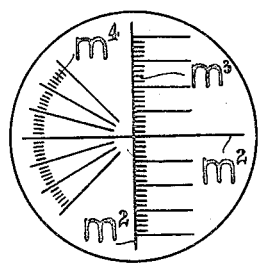

H. HORT.
ARRANGEMENT FOR THE DETERMINATION OF THE DIRECTION OF THE AXIS OF ROTATION OF A BODY.
APPLICATION FILED SEPT. 3, 1920.
1,434,209.
Patented Oct. 31, 1922.
3 SHEETS—SHEET 1.
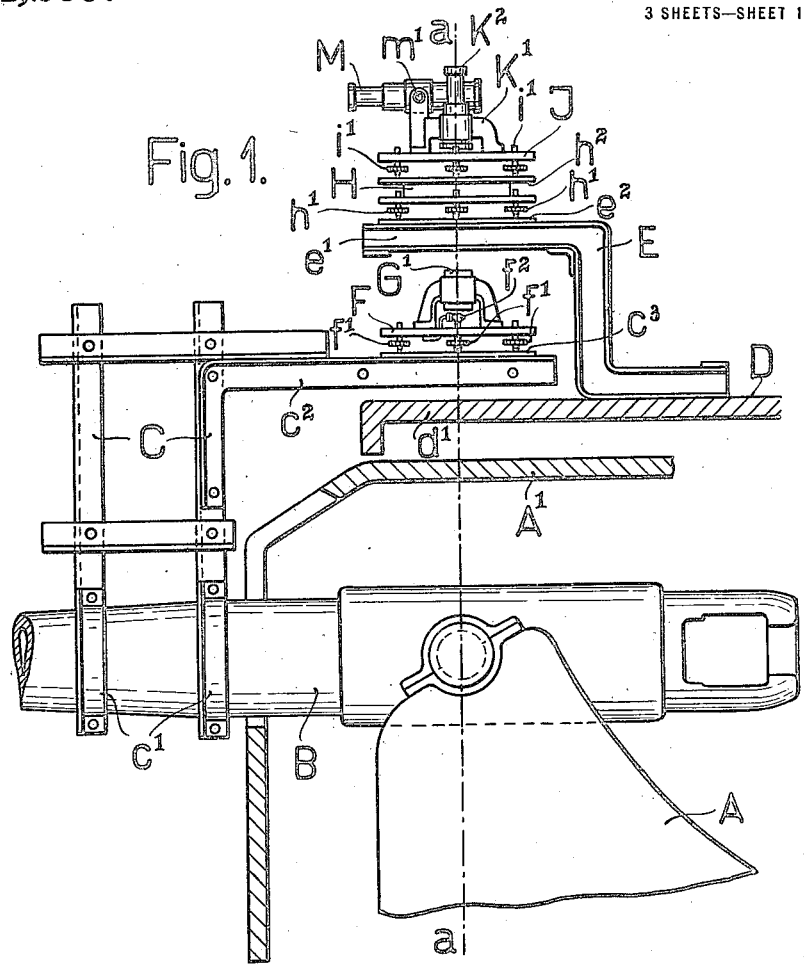
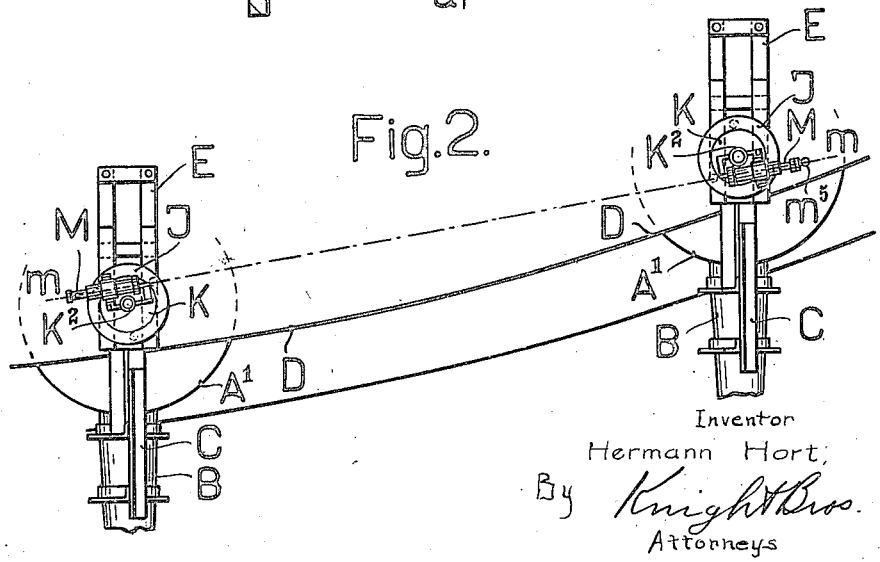
Inventor
Hermann Hort,
By Knight Bros.
Attorneys

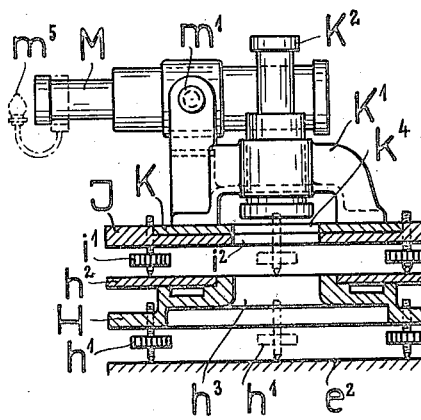
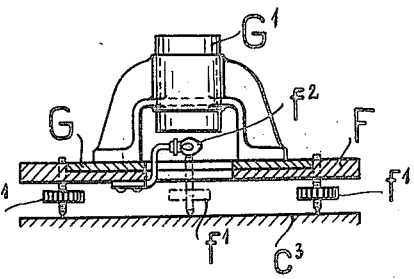
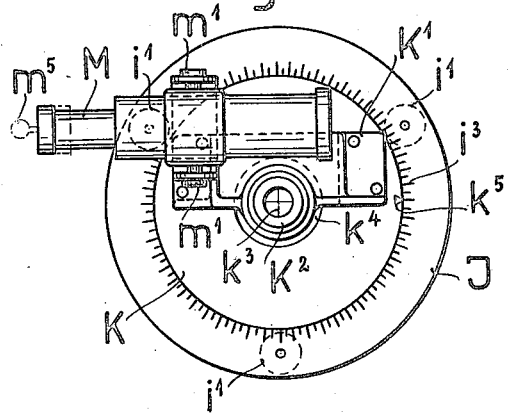
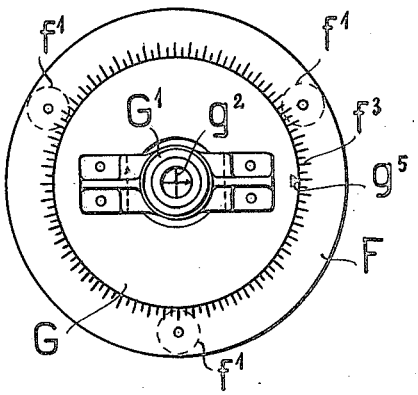
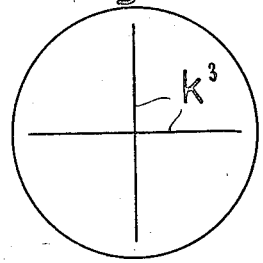
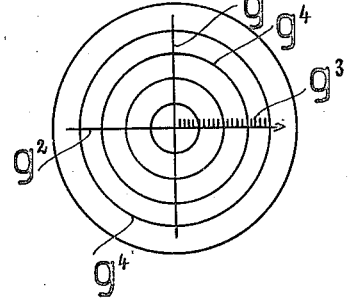

H. HORT.
ARRANGEMENT FOR THE DETERMINATION OF THE DIRECTION OF THE AXIS OF ROTATION OF A BODY.
APPLICATION FILED SEPT. 3, 1920.

1,434,209.

Patented Oct. 31, 1922.
3 SHEETS—SHEET 3.

Inventor
Hermann Hort
By Knight Bros.
Attorneys

Patented Oct. 31, 1922.

1,434,209

UNITED STATES PATENT OFFICE.

HERMANN HORT, OF ESSEN, GERMANY, ASSIGNOR TO FRIED. KRUPP AKTIEN-GESELLSCHAFT, OF ESSEN-ON-THE-RUHR, GERMANY.

ARRANGEMENT FOR THE DETERMINATION OF THE DIRECTION OF THE AXIS OF ROTATION OF A BODY.

Application filed September 3, 1920. Serial No. 408,101.

*To all whom it may concern:*

Be it known that I, Dr. HERMANN HORT, residing at Essen, Germany, a citizen of the German Republic, have invented a certain new and useful Improvement in Arrangements for the Determination of the Direction of the Axis of Rotation of a Body, of which the following is a specification.

The object of the invention is to provide a new device of extreme accuracy for determining the direction of the axis of rotation of a body.

Referring to the accompanying drawings wherein the application of this device is shown and it is assumed that the determination of the direction of the axis of rotation of the rotatable armoured gun mountings on board a ship is desired. It is, at the same time, shown in what manner the size and position of the angle, which is formed by the rotating axes of two gun mountings as determined by such a device may be measured. Moreover, it is also shown in what manner by the use of devices of this kind the reciprocal alteration of the position of two gun mountings may be made visible and measured, which alteration is due to the elastic deformation of the body of the ship during its journey or when it rolls.

The invention will be described with reference to the hereinbefore mentioned accompanying drawings in which—

Fig. 1 shows a vertical longitudinal section of a casement gun with the device for determining the axis of rotation of the gun mounting, Fig. 2 shows a plan view of two guns next to one another, Fig. 3 shows a side elevation, partly in section on a larger scale, of an optical device forming part of the invention, Fig. 4 shows a corresponding plan view, Fig. 5 shows a side elevation of a further device forming part of the invention, partly in section, Fig. 6 shows a corresponding plan view, Fig. 7-13 show representations of the sighting marks which become visible by the use of these optical devices.

Fig. 1 represents the gun carriage of a casement gun, which, together with its armour plating $A^1$ is rotatable about the vertical central axis $a$—$a$ of the gun mounting. On the part of the gun barrel B, outside the armour plating $A^1$, which for the purpose of determining the direction of the axis $a$—$a$ is fixed vertically to it, a staging C constructed of angle iron is fixed by means of supports $c^1$. This staging has an arm $c^2$, directed towards the axis of rotation $a$—$a$ and projecting over a portion $d^1$ of the deck of the ship D, on which a second stage E, which is also constructed of angled iron, is fixed, and which has an arm $e^1$ projecting over the arm $c^2$ of the staging C. On a ground plate $c^3$, attached to the free end of the arm $c^2$, there rests a foundation plate F, which serves as the foundation of a rotating disc G see Fig. 6, and is provided with three adjustable levelling screws arranged at the apices of an equilateral triangle. On the rotating disc G an optical device, comprising a line of sight adjustor (collimator) $G^1$, is fixed in such a way that its sighting mark is directed towards the foundation plate F, and its line of sight coincides with the axis of rotation of the rotating disc G. The sighting mark of the collimator determining the line of sight consists, as shown in Fig. 8, of cross wires $g^2$ provided with an angle scale $g^3$ along the one branch of the cross wires and a number of circles which are concentrically described from the point of intersection of the cross wires $g^2$. Below the collimator $G^1$ is an incandescent lamp $f^2$, fixed to the foundation plate F, and serving as illumination for the sighting mark. An indicator $g^5$ attached to the rotating disc G, and a scale division $f^3$ marked on the foundation plate F, serve for the determination of the angular position of the disc G. For this purpose, the arrangement is devised in such a way that the indicator $g^5$ points to zero on the scale $f^3$ when the branch of the cross wires $g^2$ which is provided with the scale division $g^3$, is parallel to the plane formed by the axes of two levelling screws $f^1$.

An adjustable table H is fitted on to a ground plate $e^2$, fixed to the free end of the arm $e^1$, this table having three feet comprising the three adjusting screws $h^1$. On the table plate $h^2$, which should be adjusted as level as possible by means of the screws $h^1$, there rests a foundation plate J, which serves as a foundation for a rotating disc K and is provided with three adjustable levelling screws $i^1$ arranged in the apices of an equilateral triangle (Fig. 4). The rotating disc K carries a stand $K^1$, on which a sighting telescope $K^2$ is fixed in such a way that its objective is directed towards the foundation plate J and its line of sight coincides with the axis of rotation of the rotating disc K. Coaxially to the line of sight of the telescope $K^2$, the sighting mark of which consists solely of cross wires $k^3$ (Fig. 7), there is in the rotating disc K a circular through aperture $k^4$; beneath this in the foundation plate J through aperture $i^2$ of equal size (Fig. 3) and in the adjustable table H again through aperture $h^3$ of equal size, so that the telescope $K^2$ can be directed on to the collimator $G^1$. A second sighting telescope M is attached to the stand $K^1$ by means of two trunnions $m^1$, so that it can be rocked. The common axis of the trunnions $m^1$, which is perpendicular to the line of sight of the telescope M, is situated in a plane which is perpendicular to the line of sight of the telescope $K^2$ and is parallel to the one branch of the cross wires $k^3$ of this telescope. As shown in Fig. 9 the telescope M has a sighting mark with cross wires $m^2$, the upright arm of which is at right angles to the axis of the trunnions $m^1$, and is provided on both sides of the point of intersection of the cross wires with an angle scale $m^3$. Further, the sighting mark has another angle scale $m^4$, extending in the direction of the periphery of the glass and on both sides of the other branch of the cross wires. An indicator $k^5$ (Fig. 4) on the rotating disc K and a scale division $i^3$ marked on the foundation plate J, serve to determine the angular position of this disc. For this purpose the arrangement is made in such a way that the indicator $k^5$ points to the zero of the scale $i^3$ when the axis of the trunnions $m^1$ is vertical to the plane formed by the axes of two levelling screws $i^1$ (Fig. 4).

Figure 10:
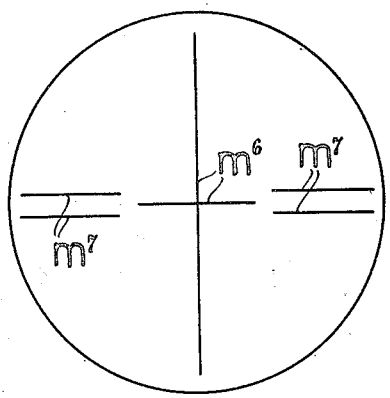

If it is only desired to determine the direction of the axis of rotation of a single gun mounting, the telescope M is not used. The use of this telescope is only necessary when it is, e. g., desired to measure the angle which this axis of rotation forms with the axis of rotation of another gun mounting near by, and of determining the angular position of the plane in which this angle is measured. A separate device of the nature described above is then necessary for each of the two gun mountings, as are also two apparatus F, G $G^1$ (Figs. 5 and 6) and two apparatus J, K $K^1$ $K^2$ M (Figs. 3 and 4). The second apparatus J, K $K^1$ $K^2$, M, is provided with an incandescent lamp $m^5$ for the telescope M (as shown by dotted lines in Figs. 3 and 4); this lamp is fixed to the eye-piece of the telescope and serves to illuminate the sighting mark of the telescope. As shown in Fig. 10, this sighting mark consists of cross wires $m^6$ and several extra wires $m^7$ parallel to the right-left running wire of the cross wires $m^6$. The arrangement of these parallel wires $m^7$ has been made solely for the purpose first mentioned, namely to measure alterations in the reciprocal position of two gun mountings, resulting from the elastic deformation of the body of the ship during its journey or when it rolls.

It may first be explained in connection with Fig. 1 how the direction of the axis of rotation $a$—$a$ of the gun mounting is determined for the single gun represented in this illustration. After the apparatus F, G, $G^1$ has been fixed on the ground plate $c^3$ and the adjustable table H with the apparatus J, K $K^1$ $K^2$ M has been fixed on the ground plate $e^2$ in such a way that the lines of sight of the telescope $K^2$ and the collimator $G^1$ coincide as far as possible with the axis $a$—$a$, the sighting mark of the collimator $G^1$ (Fig. 11) will be seen in the field of vision of the telescope $K^2$. The point of intersection of the cross wires $g^2$ of the collimator will then, as a rule, be at a definite radial distance $w$ from the point of intersection of the cross wires $k^3$ of the telescope $K^2$ and this distance corresponds to the angle which the line of sight of the collimator $G^1$ forms with the line of sight of the telescope $K^2$. If the line of sight of the collimator $G^1$ should have exactly the same direction as the axis of rotation $a$—$a$, the angle, which the line of sight of the collimator $G^1$ describes with the line of sight of the telescope $K^2$ would remain the same on traversing the gun, and similarly the angular position of the plane in which this angle is measured. On traversing the gun, therefore, on the axis $a$—$a$, the centre of the cross wires $g^2$ of the collimator $G^1$ would remain in the field of vision of the telescope $K^2$ at an unchangeable distance from the centre of the cross wires $k^3$ of the telescope $K^2$, and the connecting line of both centres would retain their angular position with respect to the branches of the cross wires $k^3$ unchanged i. e. the centre of the cross wires $g^2$ would appear stationary in the field of vision of the telescope $K^2$. As long, however, as the line of sight of the collimator $G^1$ forms with the axis of rotation $a$—$a$ an angle other than zero, the magnitude of the angle which the line of sight of the collimator $G^1$ forms with the line of sight of the telescope $K^2$ when the gun is traversed, as also the angular position of the plane in which this angle is measured, must continually change. Hence, when the gun is traversed about the axis $a$—$a$, in the field of vision of the telescope $K^2$ the centre of the cross wires $g^2$ must move both in a radial and in a circumferential direction. By turning the levelling screws $f^1$ of the foundation plate F, the direction of the line of vision of the collimator $G^1$ is now so adjusted until on traversing the gun about the axis $a$—$a$, the point of intersection of the cross wires $g^2$ retains its position unchanged in the field of vision of the telescope $K^2$. The determination of this condition is exceptionally facilitated by the concentric circles $g^4$, since every alteration of the distance of the centre of the two cross wires $g^2$ and $K^3$ is readily rendered perceptible by the alteration of the distance between the centre of the cross wires $k^3$ and the nearest circle $g^4$. When the collimator $G^1$ is so adjusted that in traversing the gun the point of intersection of the cross wires $g^2$ retains its position unchanged in the field of vision of the telescope $K^2$, the line of vision of the collimator coincides exactly, in accordance with what has been explained, with the direction of the axis of rotation $a$—$a$. If now the line of sight of the telescope $K^2$ be brought by turning the levelling screws $i^1$ into such a position that the centre of the cross wires $k^3$ coincides with the centre of the cross wires $g^2$, the line of sight would have the same direction as the line of sight of the collimator $G^1$ and consequently also as the axis of rotation $a$—$a$. The direction of the axis of rotation $a$—$a$ is then determined on the rotatable body (A, $A^1$) by the line of sight of the collimator $G^1$ and on the fixed body (D) by the line of sight of the telescope $K^2$.

It may now be explained how, by means of the device described, the magnitude of the angle may be determined, which is included between the axes of rotation of two guns near one another (see Fig. 2), and also the angular position of the plane in which this angle is measured. The axis of rotation of each of the two neighbouring guns (Fig. 2) may be determined in the manner described by means of a separate set of each of the apparatus F, G $G^1$ and J K $K^1$ $K^2$, M and it may be assumed that the apparatus J, K $K^1$ $K^2$, M used with the gun shown on the right in Fig. 2 is the one, the telescope M of which has its sighting mark illuminated by the incandescent lamp $m^5$ as in Fig. 10.

Firstly the apparatus F, G $G^1$ attached to the gun shown on the left in Fig. 2 should be brought into such an angular position by turning its foundation plate F upon the ground plate $c^3$ (while the indicator $g^5$ points to the zero mark of the scale division $f^3$) that the cross wire $g^2$ provided with the scale division $g^3$ points in the direction of the keel line of the ship when the gun has a definite lateral angular position in which it is subsequently to be fixed. For this purpose the gun is moved into the above-mentioned lateral angular position, and then the rotating disc K over this gun, the axis of which has the same direction as the axis of rotation of the gun, is turned into such a position that the line of sight of the telescope M is parallel to the plane of elevation vertical to the trunnions of the gun. The determination of this position is effected by the use of apparatus of the ordinary construction which need not be described in detail here. Also the cross wire $k^3$ vertical to the axis of the trunnions $m^1$ then becomes parallel to the plane of elevation of the gun. The magnitude of the angle described by the plane of elevation in the above-mentioned lateral angular position of the gun with the keel line of the ship, may then be read upon the scale (not shown in the diagram) of the traversing gear tion of the gun. The magnitude of the an moved through the angle read on the scale, the cross wire $k^3$, vertical to the axis of the trunnion $m^1$, is made to coincide with the direction of the keel line. The magnitude of the angle, through which the rotating disc K is to be turned in this operation, may be ascertained by means of the indicator $k^5$ on the scale division $i^3$. Now the foundation plate F of the apparatus F, G $G^1$ is turned (the rotating disc G still remaining adjusted with the indicator $g^5$ pointing to the zero mark of the scale division $f^3$) upon the ground plate $c^3$, in such a way that the cross wire $g^2$ provided with the scale division $g^3$ coincides with the cross wire $k^3$ pointing in the direction of the keel line. If, under these conditions, the point of intersection of the cross wires $g^2$ does not coincide with the point of intersection of the cross wires $k^3$, the foundation plate F must be so adjusted by further turning of the levelling screws $f^1$, so that the centres of both cross wires coincide. The line of sight of the collimator $G^1$ then again points in the same direction as the line of sight of the telescope $K^2$ and therefore in the same direction as the axis of rotation of the gun mounting. After determining once more, by traversing the gun mounting whether the centres of the two cross wires remain coinciding, i. e., whether both lines of sight coincide with the direction of the axis of rotation of the gun mounting, this latter remains fixed with respect to the deck of the ship in the angular position in question in which the cross wire $g^2$ provided with the scale division $g^3$ coincides with the direction of the keel line.

Figure 11:
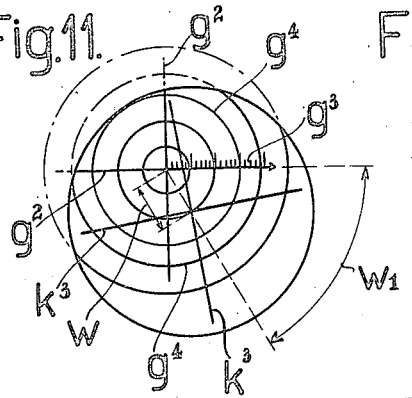
Figure 12:
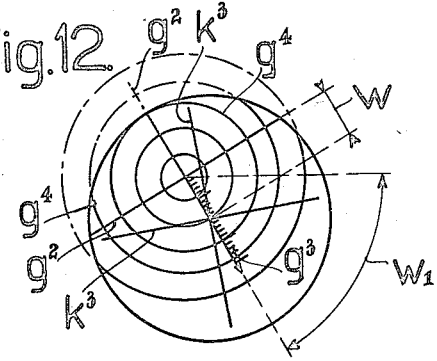

Now the telescopes on the two neighbouring gun mountings are turned towards each other in such a way that the sighting mark illuminated by the incandescent lamp $m^5$ of the telescope M of the gun upon the right, appears in the field of vision of the telescope M upon the gun on the left. For this purpose, the rotating disc K upon the right gun is turned towards the foundation plate J, and the foundation plate J on the left gun is moved towards the table plate $h^2$ of the adjustable table H. The rotating disc K of the apparatus J, K $K^1$ $K^2$, M on the left gun is so adjusted in this case that its indicator $k^5$ points to the zero mark of the scale division $i^3$; the axis of the trunnions $m^1$ and the cross wire $m^2$ which is parallel to this, thus stand vertically in relation to the plane formed by the axes of two of the levelling screws $i^1$. The two apparatus J, K $K^1$ $K^2$, M are so adjusted in the manner described, that the points of intersection of the two cross wires $m^2$ and $m^6$ coincide in the field of vision of the telescope on the left hand gun. If necessary, for this purpose the levelling screws $i^1$ must be readjusted also on the left hand gun. The lines of sight of the two telescopes M have then the same direction as is indicated by the dotted lines $m$—$m$ in Fig. 2. The rotatability of the two telescopes M about the axis of the trunnions $m^1$ enables the operator to adjust the lines of sight in the same direction even when the two apparatus J, K $K^1$ $K^2$, M are mounted at different levels. After the points of intersection of the cross wires $m^2$ and $m^6$ have been made to coincide, that wire of the cross wire $m^2$ which is parallel to the axis of the trunnions $m^1$ of the left hand gun, is rotated by turning the levelling screw $i^1$, the axis of which, in the case of the angular position of the rotating disc K described in Fig. 4 lies in the axial plane parallel to the axis of the trunnions $m^1$, until this wire coincides with the corresponding cross wire $m^6$, so that both cross wires then coincide completely. The line of sight of the telescope $K^2$ over the left hand gun is now made parallel to the line of sight of the telescope over the right hand gun; it is then (since the direction of the latter line of sight has remained unchanged and therefore runs in the direction of the axis of rotation of the right gun mounting) parallel to this axis. If the axes of rotation of both gun mountings are inclined towards each other, the field of vision of the telescope $K^2$ on the left must, as clearly indicated in Fig. 11 show the point of intersection of the cross wires $g^2$ of the collimator below it, deviating to a certain extent from zero, from the centre of the cross wires $k^3$. The magnitude of this deviation, which is indicated on the drawing (Figs. 11 and 12) by $w$, is used to denote the size of the angle which is formed by the axes of rotation of the two gun mountings. The magnitude of this angle may be read upon the scale $g^3$ of the collimator, after the rotating disc G has been turned through such an angle, that the cross wire $g^2$ provided with the scale division $g^3$ passes through the centre of the cross wires $k^3$ of the telescope $K^2$ (Fig. 12). The magnitude of the angle of rotation designated by $w^1$ (Figs. 11 and 12) and which can be read upon the scale division $f^3$ (Fig. 6) by means of the indicator $g^5$, is used to denote the angular position of the plane in which the angle ($w$) formed by the axes of rotation of both gun mountings can be determined.

If the two gun mountings occupy such a position that it is not possible to view directly with the telescope M on one gun the telescope M on the other gun, the following method is adopted. An intermediate point is sought from which the apparatus J, K $K^1$ $K^2$, M both on the left hand gun mounting and also on the right hand gun mounting is visible, and on this intermediate point is arranged a third apparatus J, K $K^1$ $K^2$, M which like the second apparatus has an incandescent lamp to illuminate the sighting mark of its telescope M. Whilst, however in the case of the second apparatus the incandescent lamp $m^5$ remains permanently in position, so that the telescope M of this apparatus serves as a collimator and may also be replaced thereby, in the third apparatus the device is so arranged that the incandescent lamp may be removed at will, with the result that the telescope of the third apparatus may be used either as a telescope or as a collimator. The third and second apparatus are now adjusted towards each other in the same way as has been described in the case of the first and second apparatus, so that the cross wires of the telescope M of the third apparatus now used as a sighting telescope, completely coincides with the cross wires of the telescope M of the second apparatus over the right gun mounting. The axis of rotation of the rotating disc K of the third apparatus is then parallel to the axis of rotation of the right gun mounting. The first and third apparatus are now adjusted relatively to each other in the same way as has been outlined in the case of the first and second apparatus in such a way that the cross wires of the telescope M of the first apparatus upon the left hand gun mounting completely coincides with the cross wires of the telescope M of the third apparatus upon the intermediate point. The line of sight of the telescope $K^2$ of the first apparatus is then parallel to the axis of rotation of the rotating disc of the third apparatus and consequently also to the axis of rotation of the right gun mounting, so that the angle described between the axes of rotation of both gun mountings and the angular position of the plane in which this angle is measured, may be determined in the same manner as before. Since in the method described of using the third apparatus the sighting telescope $K^2$ is not used, it may be omitted from the third apparatus.

Figure 13:
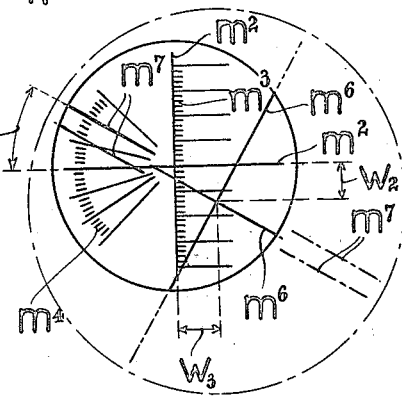

The first and second apparatus J, K $K^1$ $K^2$, M may also be used to measure the reciprocal alterations in position which two gun mountings undergo on account of the elastic deformation of the ship during the journey or when it rolls. For this reason suppose the first apparatus fixed on one gun mounting and the second apparatus J, K $K^1$ $K^2$, M on the other gun mounting (if necessary with the aid of an adjustable plate H in each case) while the ship is at rest. The telescope M of the first apparatus is then so pointed in the manner described above, to the sighting mark of the telescope M of the second apparatus, which is illuminated by the incandescent lamp $m^5$, that the cross wires $m^2$ and $m^6$ completely coincide. When the ship is under way or is rolling, the two gun mountings, in consequence of the deformations of the body of the ship, undergo a reciprocal change of position of periodical variable magnitude. This produces in the field of vision of the telescope M of the first apparatus, at the moment of the maximum reciprocal change of position for instance, an image as shown in Fig. 13. From this image it is possible to estimate upon the scale division $m^3$ the angle $w^2$ through which the second gun mounting has rotated in relation to the first in the vertical direction and also to estimate the magnitude of the angle of declination $w^3$ in the lateral direction. That of the parallels $m^7$, which as accurately as possible passes through the point of intersection of the cross wires $m^2$ shows finally on the scale division $m^4$ the angle of declination $w^4$, through which the second gun mounting has rotated in relation to the first about an axis lying in the direction of the line of sight of the telescope.

Claims:

1. In an arrangement of the class described the combination with a rotatable body and a fixed part, of two optical apparatuses mounted upon said rotatable body and said fixed part respectively, means for adjusting these optical apparatuses so as to bring their line of sight into coincidence, one of said optical apparatuses comprising a sighting telescope.

2. An arrangement of the class described for determining the direction of the axis of rotation of a rotatable body with respect to a fixed part comprising a rotatable body and a fixed part two optical apparatuses, one of said optical apparatuses being fixed upon said rotatable body and the other of said optical apparatuses being mounted upon the fixed part, means whereby the line of sight of said optical apparatuses may be adjusted so that the line of sight of the two apparatuses will coincide, one of said optical apparatuses being provided with a sighting mark having a series of concentrically arranged circles thereon.

3. A device of the class described for determining the direction of the axis of rotation of a rotatable body with respect to a fixed part, comprising rotatable bodies and a fixed part, an optical apparatus fixed to each of the rotatable bodies, cooperating optical apparatuses carried by the fixed body, each of said latter optical apparatuses comprising a base and means supporting the sighting device of said optical apparatus whereby it may be rotated about an axis lying in the direction of its line of sight, additional sighting devices forming a part of each of said latter optical apparatuses, the line of sight of which is directed transversely to the axis of rotation of said associated sighting device, one of said additional sighting devices comprising a sighting telescope.

4. In an arrangement of the class described the combination with a rotatable body and a fixed part of optical apparatuses, one of said optical apparatuses comprising a collimator and means rotatably supporting said collimator whereby it may be rotated about an axis lying in the direction of its line of sight, said collimator being provided with a graduated glass provided with an angular scale division arranged along a straight line passing through the center of said sighting mark.

5. An arrangement of the class described for determining the axis of rotation of rotatable bodies with respect to a fixed part comprising the combination with rotatable bodies and a fixed part of optical apparatuses carried by said rotatable bodies, cooperating optical apparatuses carried by the fixed part, each of said cooperating apparatuses comprising a base, a sighting device, means supporting said sighting device whereby it may be rotated with respect to said base about an axis lying in the direction of its line of sight, a second sighting device forming a part of each of said cooperating optical apparatuses, the line of sight of said second sighting device being arranged transversely to the axis of rotation of said first mentioned sighting device, one of said second sighting devices being provided with a graduated glass having an angular scale division arranged along a sight line passing through the center of said sighting mark.

6. An arrangement of the class described comprising the combination with rotatable bodies and a fixed part of optical apparatuses fixed to said rotatable bodies, cooperating optical apparatuses carried by said fixed part, each cooperating apparatus comprising a sighting device, a base, means for rotating said sighting device with respect to said base about an axis lying in the direction of its line of sight, second sighting devices forming a part of said optical apparatuses, each of said second sighting devices having its line of sight arranged transversely to the axis of rotation of said first mentioned sighting device, the second sighting device of one of said cooperating optical apparatuses being provided with a sighting mark having an angular scale division circumferentially arranged, thereby enabling the angle of declination of the two cooperating optical apparatuses to be measured when said second sighting devices are pointed to each other.

7. A device of the class described comprising the combination with rotatable bodies and a fixed part of optical apparatuses carried by said rotatable bodies, cooperating optical apparatuses carried by said fixed part, each of said cooperating optical apparatuses being provided with a sighting device whereby the angle of declination between the two optical apparatuses may be measured when said sighting devices are pointed toward each other, a sighting mark contained in one of said sighting devices and provided with an angular scale circumferentially arranged and a sighting mark contained in the other sighting device provided with a multiplicity of parallel lines.

8. An arrangement for determining the direction of the axis of rotation of a rotatable body with respect to a fixed part comprising a rotatable body and a fixed part, an optical apparatus having a sighting mark for fixing a sighting line, another optical apparatus being a sighting telescope, one of said optical apparatuses being mounted upon said rotatable body and the other upon said fixed part in such positions that the sighting mark of said first-named optical apparatus remains in the field of vision of said sighting telescope during the rotation of said rotatable body, and means for adjusting the angular position of the sighting line of the optical apparatus mounted upon said rotatable body.

9. An arrangement for determining the direction of the axis of rotation of a rotatable body with respect to a fixed part comprising in combination, a rotatable body, a fixed part, an optical apparatus having a sighting mark for fixing a sighting line, another optical apparatus being a sighting telescope, one of said optical apparatuses being mounted upon said rotatable body and the other upon said fixed part in such positions that the sighting mark of said first-named optical apparatus remains in the field of vision of said sighting telescope during the rotation of said rotatable body, and means for adjusting the angular positions of the sighting lines of both optical apparatuses.

10. An arrangement for determining the direction of the axis of rotation of a rotatable body with respect to a fixed part comprising a rotatable body, a fixed part, an optical apparatus having a sighting mark for fixing a sighting line, said optical apparatus being mounted upon said rotatable body, a sighting telescope mounted upon said fixed part, said optical apparatus and said sighting telescope being arranged in such positions that the sighting mark of said optical apparatus remains in the field of vision of said sighting telescope during the rotation of said rotatable body, and means for adjusting the angular position of the sighting line of said optical apparatus.

11. An arrangement for determining the direction of the axis of rotation of a rotatable body with respect to a fixed part comprising the combination with a rotatable body and a fixed part of an optical apparatus having a sighting mark for fixing a sighting line, another optical apparatus being a sighting telescope, the sighting mark of one of said optical apparatuses being constructed with a plurality of concentrical circles and one of said optical apparatuses being mounted upon said rotatable body and the other upon said fixed part in such positions that the sighting mark of said first-named optical apparatus remains in the field of vision of said sighting telescope during the rotation of said rotatable body, and means for adjusting the angular position of the sighting line of the optical apparatus mounted upon said rotatable body.

12. An arrangement for determining the direction of the axis of rotation of a rotatable body with respect to a fixed part comprising the combination with a rotatable body and a fixed part of an optical apparatus having a sighting mark constructed with a plurality of concentrical circles for fixing a sighting line, said optical apparatus being mounted upon said rotatable body, a sighting telescope mounted upon said fixed part, said optical apparatus and said sighting telescope being arranged in such positions that the sighting mark of said optical apparatus remains in the field of vision of said sighting telescope during the rotation of said rotatable body, and means for adjusting the angular position of the sighting line of said optical apparatus.

13. An arrangement for determining the angle described by the axis of rotation of two bodies rotatable with respect to a fixed part comprising in combination, two rotatable bodies and a fixed part, a pair of optical apparatuses each having a sighting mark for fixing a sighting line, another pair of optical apparatuses each being a sighting telescope, each of said rotatable bodies carrying one of said optical apparatuses and the other optical apparatuses being mounted upon said fixed part in such a way that each sighting telescope is situated opposite to one of the other optical apparatuses, two bases on which the optical apparatuses mounted upon the fixed part are rotatable about axes lying in the direction of the lines of sight of said optical apparatuses, means for adjusting the optical apparatuses carried by said rotatable bodies so that their lines of sight have the same directions as the axes of rotation of said rotatable bodies, means for adjusting each base for angularly displacing the axis of rotation of the optical apparatus carried thereby, and two additional optical apparatuses mounted on said bases to rotate in unison with the main optical apparatuses carried by said bases, each of said additional optical apparatuses having a sighting line directed transversely to the axis of rotation of the main optical apparatus carried by the same base and one of said additional optical apparatuses being a sighting telescope.

14. An arrangement for determining the angle described by the axes of rotation of two bodies rotatable with respect to a fixed part comprising the combination with two rotatable bodies and a fixed part of a pair of optical apparatuses each having a sighting mark for fixing a sighting line, another pair of optical apparatuses each being a sighting telescope, each of said rotatable bodies carrying one of said optical apparatuses and the other optical apparatuses being mounted upon said fixed part in such a way that each sighting telescope is situated opposite to one of the other optical apparatuses, two bases on which the optical apparatuses mounted upon the fixed part are rotatable about axes lying in the direction of the lines of sight of said optical apparatuses, means for adjusting the optical apparatuses carried by said rotatable bodies so that their lines of sight have the same directions as the axes of rotation of said rotatable bodies, one of said last-named optical apparatuses being rotatable about an axis coinciding with its line of sight and having in its sighting mark a straight line passing through the center of said sighting mark and an angular scale arranged along said straight line, means for adjusting each base for angularly displacing the axis of rotation of the optical apparatus carried thereby and two additional optical apparatuses mounted on said bases to rotate in unison with the main optical apparatuses carried by said bases, each of said additional optical apparatuses having a sighting line directed transversely to the axis of rotation of the main optical apparatus carried by the same base and one of said additional optical apparatuses being a sighting telescope.

15. An arrangement for determining the angle described by the axes of rotation of two bodies rotatable with respect to a fixed part comprising the combination with two rotatable bodies and a fixed part of a pair of optical apparatuses each having a sighting mark for fixing a sighting line, another pair of optical apparatuses each being a sighting telescope, each of said rotatable bodies carrying one of said optical apparatuses and the other optical apparatuses being mounted upon said fixed part in such a way that each sighting telescope is situated opposite to one of the other optical apparatuses, two bases on which the optical apparatuses mounted upon the fixed part are rotatable about axes lying in the direction of the lines of sight of said optical apparatuses, means for adjusting the optical apparatuses carried by said rotatable bodies so that their lines of sight have the same directions as the axes of rotation of said rotatable bodies, means for adjusting each base for angularly displacing the axis of rotation of the optical apparatus carried thereby, two additional optical apparatuses mounted on said bases to rotate in unison with the main optical apparatuses carried by said bases and a sighting mark in each of said additional optical apparatuses for fixing a sighting line directed transversely to the axis of rotation of the main optical apparatus carried by the same base, the sighting mark of the one additional optical apparatus being constructed with a straight line passing through the center of the sighting mark and with an angular scale arranged along said straight line and one of said additional optical apparatuses being a sighting telescope.

16. An arrangement for determining the angle described by the axes of rotation of two bodies rotatable with respect to a fixed part comprising the combination with two rotatable bodies and a fixed part of a pair of optical apparatuses each having a sighting mark for fixing a sighting line, another pair of optical apparatuses each being a sighting telescope, each of said rotatable bodies carrying one of said optical apparatuses and the other optical apparatuses being mounted upon said fixed part in such a way that each sighting telescope is situated opposite to one of the other optical apparatuses, two bases on which the optical apparatuses mounted upon the fixed part are rotatable about axes lying in the direction of the lines of sight of said optical apparatuses, means for adjusting the optical apparatuses carried by said rotatable bodies so that their lines of sight have the same directions as the axes of rotation of said rotatable bodies, means for adjusting each base for angularly displacing the axes of rotation of the optical apparatus carried thereby, two additional optical apparatuses mounted on said bases to rotate in unison with the main optical apparatuses carried by said bases and a sighting mark in each of said additional optical apparatuses for fixing a sighting line directed transversely to the axis of rotation of the main optical apparatus carried by the same base, the sighting mark of the one additional optical apparatus being constructed with an angular scale circumferentially arranged and one of said additional optical apparatuses being a sighting telescope.

17. An arrangement for determining the angle described by the axes of rotation of two bodies rotatable with respect to a fixed part comprising in combination, two rotatable bodies and a fixed part, a pair of optical apparatuses each having a sighting mark for fixing a sighting line, another pair of optical apparatuses each being a sighting telescope, each of said rotatable bodies carrying one of said optical apparatuses and the other optical apparatuses being mounted upon said fixed part in such a way that each sighting telescope is situated opposite to one of the other optical apparatuses, two bases on which the optical apparatuses mounted upon the fixed part are rotatable about axes lying in the direction of the lines of sight of said optical apparatuses, means for adjusting the optical apparatuses carried by said rotatable bodies so that their lines of sight have the same directions as the axes of rotation of said rotatable bodies, means for adjusting each base for angularly displacing the axis of rotation of the optical apparatus carried thereby, two additional optical apparatuses mounted on said bases to rotate in unison with the main optical apparatuses carried by said bases and a sighting mark in each of said additional optical apparatuses for fixing a sighting line directed transversely to the axis of rotation of the main optical apparatus carried by the same base, the sighting mark of the one additional optical apparatus being constructed with an angular scale circumferentially arranged and the sighting mark of the other additional optical apparatus with a plurality of parallel lines and one of said additional optical apparatuses being a sighting telescope.

The foregoing specification signed at Essen, Germany, this 12th day of June, 1920.

Dr. HERMANN HORT.

In presence of—
 Hans Gottsmann,
 Josef Olbertz.